US008499436B2

(12) United States Patent
Shen

(10) Patent No.: US 8,499,436 B2
(45) Date of Patent: Aug. 6, 2013

(54) TOOL DEVICE FOR DISMANTLING JOINT

(76) Inventor: Wei nan Shen, Taichung (TW)

( * ) Notice: Subject to any disclaimer, the term of this patent is extended or adjusted under 35 U.S.C. 154(b) by 325 days.

(21) Appl. No.: 12/930,429

(22) Filed: Jan. 6, 2011

(65) Prior Publication Data

US 2012/0174388 A1 Jul. 12, 2012

(51) Int. Cl.
*B23P 19/04* (2006.01)
*B21D 53/10* (2006.01)

(52) U.S. Cl.
USPC .................. 29/724; 29/257; 29/725; 29/267; 29/251; 29/898.08; 29/426.5; 269/93; 269/94

(58) Field of Classification Search
USPC .................. 29/724, 725, 257, 251, 263, 266, 29/267, 898.08, 426.5, 426.6; 269/91, 93, 269/94
See application file for complete search history.

(56) References Cited

U.S. PATENT DOCUMENTS

| | | | | |
|---|---|---|---|---|
| 3,210,069 | A * | 10/1965 | Holtz | 269/94 |
| 3,846,891 | A * | 11/1974 | Elg | 29/261 |
| 5,586,378 | A * | 12/1996 | Smith | 29/257 |
| 5,906,034 | A | 5/1999 | Weisshaar | |
| 6,085,399 | A * | 7/2000 | Fileccia | 29/239 |
| 6,546,610 | B2 | 4/2003 | Klann | |
| 6,665,918 | B1 * | 12/2003 | Williams | 29/259 |
| 8,281,506 | B2 * | 10/2012 | Stefek et al. | 37/468 |
| 8,371,010 | B2 * | 2/2013 | Jill | 29/426.1 |
| 2012/0272499 | A1 * | 11/2012 | Schley et al. | 29/426.5 |
| 2013/0008153 | A1 * | 1/2013 | Stefek et al. | 60/327 |

* cited by examiner

*Primary Examiner* — Essama Omgba
(74) *Attorney, Agent, or Firm* — Charles E. Baxley

(57) ABSTRACT

A tool device includes a support lever having two screw holes, a pressing lever, an adjusting member is threaded with one of the screw holes and pivotally coupled to the middle portion of the pressing lever, and a pressing member is threaded with the other screw hole of the support lever and has an end portion for engaging with a rear portion of the pressing lever, a holding member is attached to the support lever and includes a front portion having an opening, and a retaining member is changeably attached to the support lever for engaging with the holding member and for selectively engaging or retaining the ball joint or universal joint between the retaining member and the pressing lever.

7 Claims, 4 Drawing Sheets

TOOL DEVICE FOR DISMANTLING JOINT

BACKGROUND OF THE INVENTION

1. Field of the Invention

The present invention relates to a tool device, and more particularly to a tool device for dismantling or disengaging a roller or ball-shaped bearing member from a ball joint or universal joint or the like and for allowing the bearing member to be easily dismantled or disengaged from the ball joint or universal joint by the users themselves.

2. Description of the Prior Art

Typical ball joints or universal joints comprise a ball member rotatably received or engaged in a socket or housing. Normally, the socket or housing includes a solid structure for stably receiving the ball member and for preventing the ball member from being removed or disengaged from the socket or housing particularly when the ball member is rotated in a great speed relative to the socket or housing.

When the typical ball joints or universal joints have been damaged or when the ball member has been worn out, it will be difficult to remove or disengage the ball member from the socket or housing, particularly may not be easily removed or disengaged from the socket or housing by the users themselves. In addition, a number of different tool members or tool devices are required to be purchased and prepared to remove or disengage the ball member from the socket or housing.

For example, U.S. Pat. No. 5,906,034 to Weisshaar, and U.S. Pat. No. 6,546,610 to Klann disclose two of the typical devices for loosening a screw seated tightly in a mounting hole of a bearing eye or the like and comprise a support body for supporting the sockets or housings of the bearing eyes, and one or more spacer members for moving or separating the ears of the sockets or housings of the bearing eyes from each other and for removing or disengaging the ball member from the sockets or housings of the bearing eyes.

However, the sockets or housings of the bearing eyes may include different widths or thicknesses, and the support body may not be used for supporting the sockets or housings of the bearing eyes of different widths or thicknesses, such that the users have to purchase or prepare many support bodies in order to support the sockets or housings of the bearing eyes of different widths or thicknesses.

The present invention has arisen to mitigate and/or obviate the afore-described disadvantages of the conventional tool devices for removing or disengaging the bearing members from the sockets or housings.

SUMMARY OF THE INVENTION

The primary objective of the present invention is to provide a tool device for easily and quickly removing or disengaging the bearing members from the sockets or housings of the ball joints or universal joints when required.

The other objective of the present invention is to provide a tool device for easily and quickly removing or disengaging the bearing members from the sockets or housings of the ball joints or universal joints when the sockets or housings include two end ears of different sizes or dimensions or widths.

In accordance with one aspect of the present invention, there is provided a tool device for dismantling a bearing member from a housing of a universal joint, the tool device comprising a support lever including a front portion and a rear portion each having a screw hole formed therein, a pressing lever including a middle portion and a front portion and a rear portion, an adjusting member including an outer thread for engaging with one of the screw holes of the support lever and including an end pivotally coupled to the middle portion of the pressing lever, and a pressing member including an outer thread for engaging with the other screw hole of the support lever and including an end portion for engaging with the rear portion of the pressing lever, a holding member is attached to the support lever and includes a front portion having an opening, and a retaining member is attached to the support lever for engaging with the holding member.

The retaining member includes one or more tongues extended outwardly therefrom for engaging with the holding member and for stably and detachably anchoring or securing or retaining the holding members to the support lever. The holding member includes a flange extended into the opening thereof.

The support lever includes two side portions, and the holding member includes two legs for engaging with the side portions of the support lever and for stably and detachably anchoring or securing the holding members to the support lever.

The support lever includes an anchor provided on the front portion thereof, and the holding member includes a depression for engaging with the anchor of the support lever. The support lever includes another anchor, and the holding member includes a recess for engaging with the other anchor of the support lever. The support lever includes a seat for engaging with the holding member and for stably and detachably anchoring or securing or retaining the holding members to the support lever.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
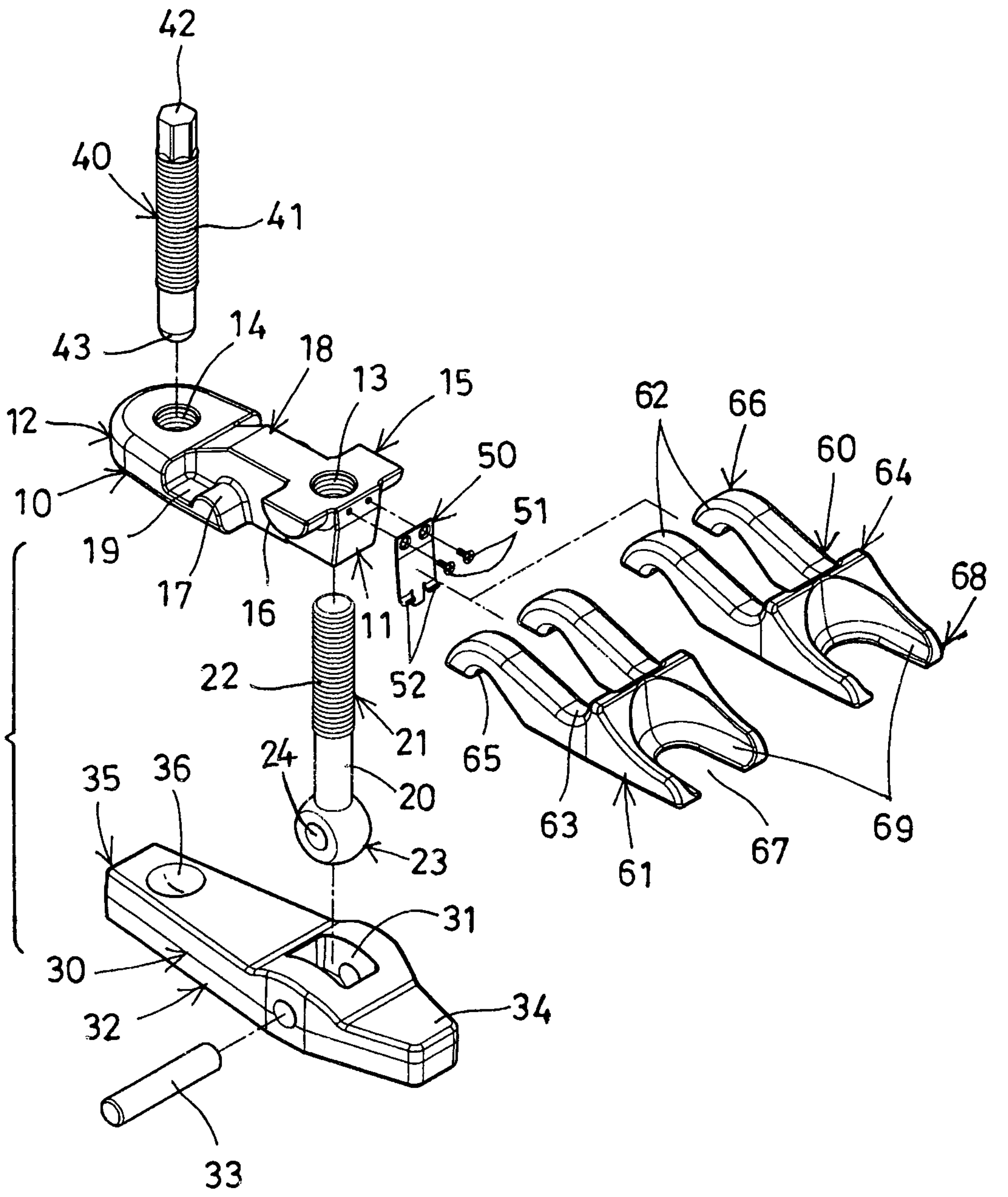
FIG. 1 is an exploded view of a tool device in accordance with the present invention.
Figure 2:
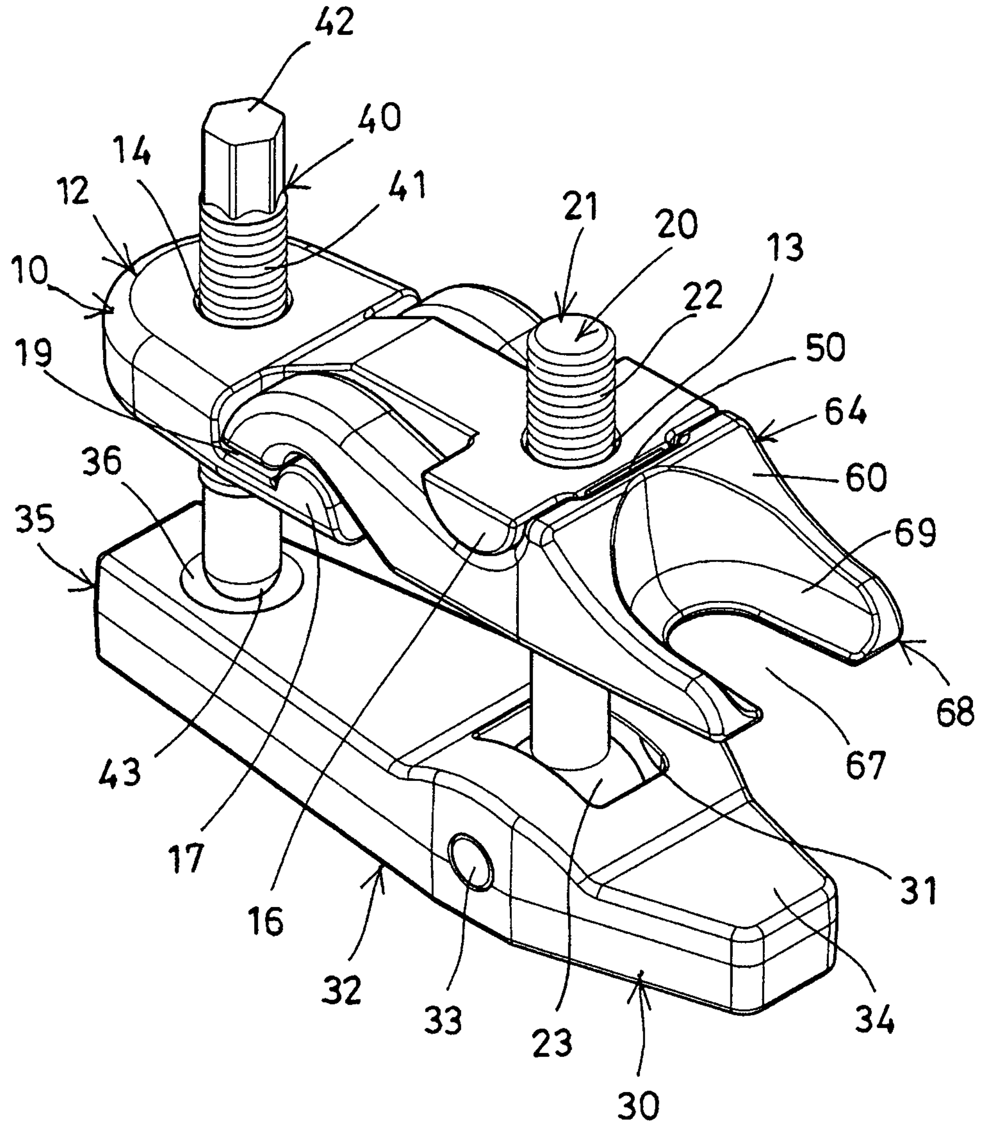
FIG. 2 is a perspective view of the tool device.
Figure 3:
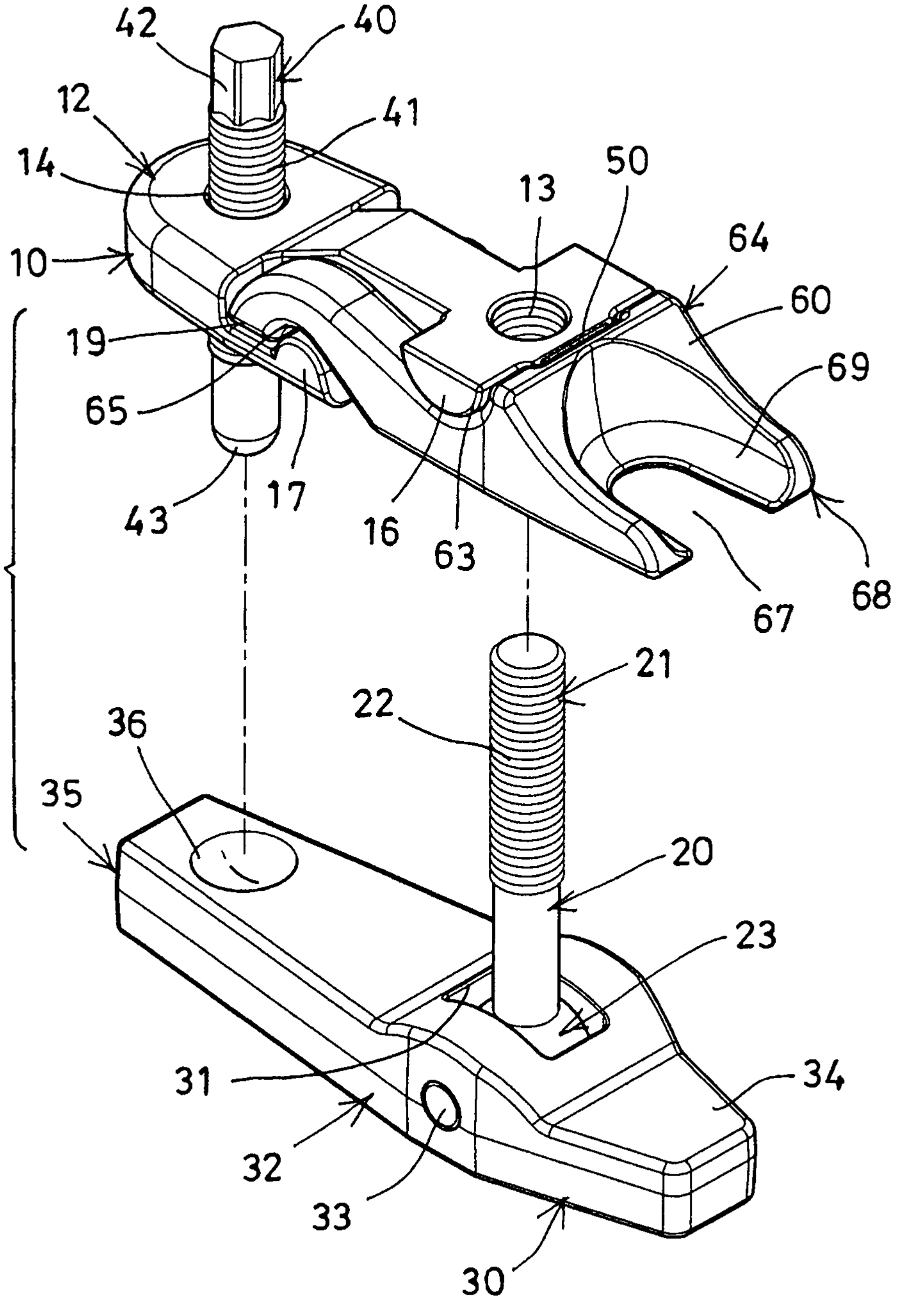
FIG. 3 is a partial exploded view of the tool device.

Referring to the drawings, and initially to FIGS. 1-3, a tool device in accordance with the present invention is provided for dismantling or disengaging one or more rollers or ball-shaped bearing members from one or more sockets or housings of one or more ball joints or universal joints (not shown) each of which include a slot formed therein for forming two end ears (not shown), and the tool device is particularly provided for separating the end ears of the housing from each other and for allowing the bearing member to be removed or disengaged from the housing.

The tool device comprises a support lever 10 including two end portions or a front portion 11 and a rear portion 12 each having an inner thread or screw hole 13, 14 formed therein, and including two side portions 15 each having an upper projection or anchor 16 formed or provided on the front portion 11 thereof, and each having a lower projection or anchor 17 formed or provided on the middle portion 18 thereof, and each having a seat 19 formed or provided on the middle portion 18 thereof and located beside or behind the lower projection or anchor 17.

An adjusting member 20 includes one end or an upper portion 21 having an outer thread 22 formed thereon for threading or engaging with one of the screw holes 13 of the support lever 10 and for moving or adjusting relative to the support lever 10, and includes the other end or a lower portion 23 having an orifice 24 formed thereon. A pressing lever 30 includes a conduit 31 formed thereon, such as formed in the middle portion 32 thereof for receiving or engaging with the lower portion 23 of the adjusting member 20, and a pin or shaft 33 is engaged through the middle portion 32 of the pressing lever 30 and also engaged through the orifice 24 of the adjusting member 20 for pivotally or rotatably attaching or mounting or securing or coupling the lower portion 23 of the adjusting member 20 to the pressing lever 30.

The pressing lever 30 includes one end or a front portion 34 for selectively or changeably engaging with the end ears of the housing of the ball joints or universal joints, and includes the other end or a rear portion 35 having a depression or curved or concave positioning member 36 formed therein. A pressing member 40 includes an outer thread 41 formed thereon for threading or engaging with the other screw hole 14 of the support lever 10 and for moving or adjusting relative to the support lever 10, and includes a non-circular upper end portion 42 for being engaged with a driving member (not shown) which may rotate the pressing member 40 relative to the support lever 10, and includes a cone or tapered or rounded tip or end portion 43 for engaging with the depression 36 of the pressing lever 30 and for moving or forcing or separating the rear portions 12, 35 of the support lever 10 and the pressing lever 30 from each other.

A spring or resilient anchoring or securing or retaining member 50 is attached or mounted or secured to the support lever 10, such as attached or mounted or secured to the front portion 11 of the support lever 10 with one or more fasteners 51, and includes one or more tongues 52 extended outwardly therefrom. One or more retaining or holding members 60, 61 each include two legs 62 for engaging with the side portions 15 of the support lever 10, and each include a depression 63 formed or provided in the upper portion of the middle portion 64 thereof for selectively engaging with the anchors 16 of the support lever 10, and each include a recess 65 formed or provided in the lower portion of the rear portion 66 thereof for selectively engaging with the other anchors 17 of the support lever 10 and for detachably attaching or mounting or securing the holding members 60, 61 to the support lever 10.

The tongues 52 of the retaining member 50 may be provided for selectively engaging with the holding members 60, 61 and for stably and detachably anchoring or securing or retaining the holding members 60, 61 to the support lever 10. The holding members 60, 61 each include an opening 67 formed or provided in the front portion 68 thereof, and a peripheral flange 69 laterally extended into the opening 67 thereof for selectively engaging with the end ears of the housing of the ball joints or universal joints, and for allowing the end ears of the housing to be separated from each other, or for removing or disengaging the bearing member from the housing when the front portion 34 of the pressing lever 30 is moved or forced toward the front portion 68 of the holding members 60, 61, and/or when the rear portions 12, 35 of the support lever 10 and the pressing lever 30 are moved or forced or separated from each other.

Figure 4:
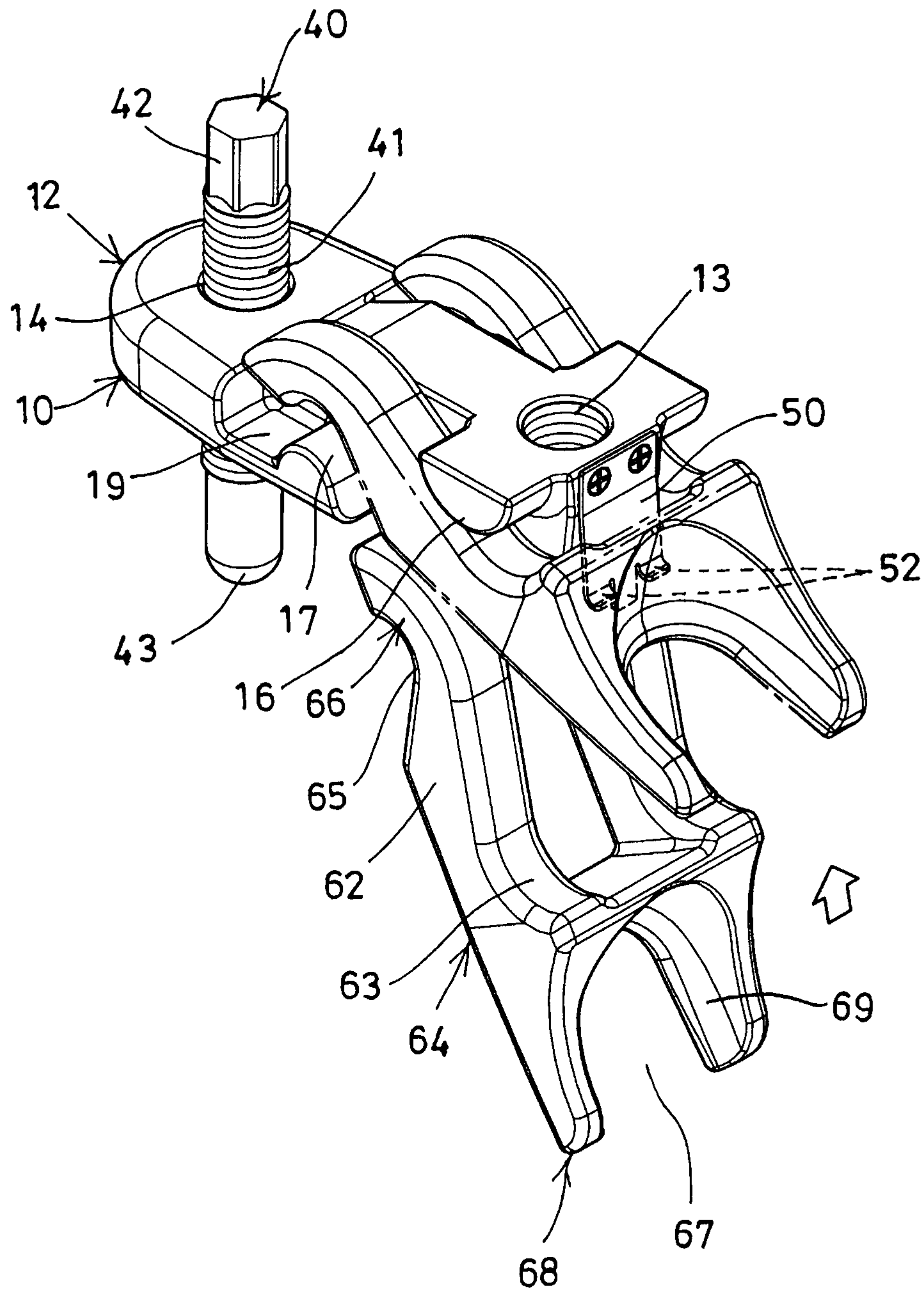
FIG. 4 is a perspective view illustrating the operation of the tool device.

In operation, as shown in FIG. 4, either of the holding members 60, 61 may be selectively and easily and quickly and detachably attached or engaged onto the lever 10 by engaging the legs 62 with the side portions 15 of the support lever 10, and by engaging the depression 63 and the recess 65 thereof with the anchors 16, 17 of the support lever 10, the tongues 52 of the retaining member 50 may be engaged with the holding members 60, 61 for stably and detachably anchoring or securing or retaining the holding members 60, 61 to the support lever 10. The housing of a ball joint or universal joint may then be disposed or engaged between the front portion 34 of the pressing lever 30 and the front portion 68 of the holding member 60, 61 and engaged with the opening 67 and the peripheral flange 69 of the holding member 60, 61, the rear portions 12, 35 of the support lever 10 and the pressing lever 30 may then be moved or forced or separated from each other with the pressing member 40, in order to move or force the front portion 34 of the pressing lever 30 toward the front portion 68 of the holding members 60, 61, and so as to remove or disengage the bearing member from the housing of the ball joint or universal joint.

Accordingly, the tool device in accordance with the present invention may be provided for easily and quickly removing or disengaging the bearing members from the sockets or housings of the ball joints or universal joints when required, or when the sockets or housings include two end ears of different sizes or dimensions or widths.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool device for dismantling a bearing member from a housing of a universal joint, the tool device comprising:

- a support lever including a front portion and a rear portion each having a screw hole formed therein,
- a pressing lever including a middle portion and a front portion and a rear portion,
- an adjusting member including an outer thread for engaging with one of the screw holes of the support lever and including an end pivotally coupled to the middle portion of the pressing lever,
- a pressing member including an outer thread for engaging with the other screw hole of the support lever and including an end portion for engaging with the rear portion of the pressing lever,
- a holding member attached to the support lever and including a front portion having an opening, and
- a retaining member attached to the support lever for engaging with the holding member.

2. The tool device as claimed in claim 1, wherein the retaining member includes a tongue for engaging with the holding member.

3. The tool device as claimed in claim 1, wherein the holding member includes a flange extended into the opening thereof.

4. The tool device as claimed in claim 1, wherein the support lever includes two side portions, and the holding member includes two legs for engaging with the side portions of the support lever.

5. The tool device as claimed in claim 1, wherein the support lever includes an anchor provided on the front portion thereof, and the holding member includes a depression for engaging with the anchor of the support lever.

6. The tool device as claimed in claim 1, wherein the support lever includes an anchor, and the holding member includes a recess for engaging with the anchor of the support lever.

7. The tool device as claimed in claim 1, wherein the support lever includes a seat for engaging with the holding member.

* * * * *